(12) United States Patent  (10) Patent No.: US 8,047,594 B1
Matthies  (45) Date of Patent: Nov. 1, 2011

(54) DETACHABLE BODY FOR MOTORCYCLE TRIKE

(76) Inventor: Lawayne L. Matthies, Dallas, TX (US)

(*) Notice: Subject to any disclaimer, the term of this patent is extended or adjusted under 35 U.S.C. 154(b) by 265 days.

(21) Appl. No.: 12/463,068

(22) Filed: May 8, 2009

Related U.S. Application Data

(63) Continuation-in-part of application No. 29/318,398, filed on May 20, 2008, now Pat. No. Des. 596,993.

(51) Int. Cl.
*B62D 24/00* (2006.01)

(52) U.S. Cl. ...... 296/35.3; 296/181.2; 296/76; 180/210; 280/504

(58) Field of Classification Search ............... 296/181.1, 296/181.2, 901.01, 76, 37.1, 35.1, 35.3; 180/210, 180/215–217; 280/504
See application file for complete search history.

(56) References Cited

U.S. PATENT DOCUMENTS

| 3,301,589 | A | * | 1/1967 | Hayden | 296/102 |
| 4,182,521 | A | * | 1/1980 | Durand et al. | 280/202 |
| 6,769,853 | B2 | * | 8/2004 | Perrot | 411/553 |
| 7,445,070 | B1 | * | 11/2008 | Pickering | 180/211 |
| 7,658,252 | B2 | * | 2/2010 | Shapiro | 180/208 |
| 7,770,683 | B2 | * | 8/2010 | Keogh et al. | 180/210 |
| 2003/0159872 | A1 | * | 8/2003 | Bell | 180/210 |
| 2010/0012411 | A1 | * | 1/2010 | Fiacchino et al. | 180/89.11 |

* cited by examiner

*Primary Examiner* — Dennis Pedder
(74) *Attorney, Agent, or Firm* — James E. Walton; Richard G. Eldredge

(57) ABSTRACT

A detachable body for a motorcycle trike has a rigid trunk section with an interior volume, the body being configured for location between rear wheel assemblies of the trike. A door adjacent the volume is operable to allow access to the volume. At least two attachment features provide for releasably attaching the body to a frame of the trike, the attachment features being operable without the use of tools for attaching and detaching the body from the frame.

4 Claims, 10 Drawing Sheets

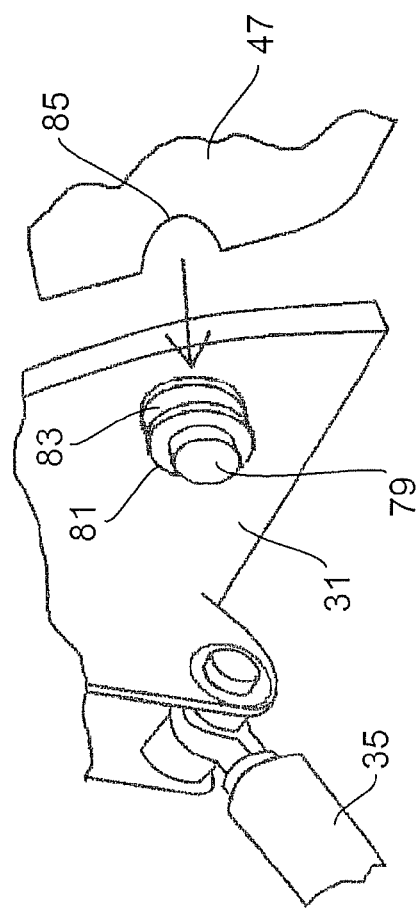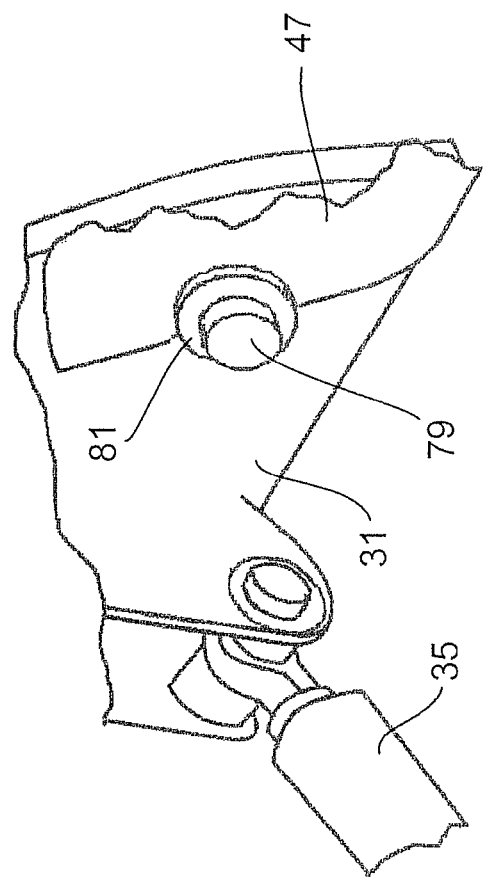

US 8,047,594 B1

DETACHABLE BODY FOR MOTORCYCLE TRIKE

This application is a continuation-in-part of U.S. patent application Ser. No. 29/318,398 filed 20 May 2008, titled "Detachable Motorcycle Trike Body."

BACKGROUND

1. Field of the Invention

This description relates generally to bodies for vehicles and specifically to detachable bodies for motorcycle trikes.

2. Description of Related Art

Three-wheeled motorcycles, as used herein, are often referred to as "motorcycle trikes" or "trikes." FIG. 1 is a rear view of a prior-art trike 11, which has a single steerable wheel assembly (not shown) in the front and two drive wheel assemblies 13 in the rear, rear wheel assemblies 13 being spaced laterally from each other. Trike 11 has a structural frame 15 that carries an engine and drivetrain components (neither are shown) and serves to provide mounting points for suspension components 17. A pivotable steering head (not shown) is attached to a front portion of frame 15, and forks or other suspension components (not shown) connect the front wheel assembly to the steering head. In the rear, suspension components 17 are attached to side portions of frame 15 and are used to connect left and right rear wheel assemblies 13 to frame 15. This configuration provides for independent suspension for all three wheel assemblies. Frame 15 of trike 11 also provides for a mounting location for seat 19, which is typically above and forward of rear wheel assemblies 13. Left and right rear fenders 21 are attached to and move with suspension components 17 and provide a means of covering wheel assemblies 13.

In addition, the frame can be configured to support body components, including styles such as drivetrain covers, fenders attached to frame 15, and fully enclosed bodies. For example, cover 23 is a drivetrain cover attached to frame 15. One popular body component is a rear-mounted trunk, which may be attached to a rear portion of frame 15 and allows for storage of various items.

Several types of body components for motorcycle trikes have been disclosed in the prior art. However, several shortcomings remain in the available designs.

DESCRIPTION OF THE DRAWINGS

FIG. 7 is an exploded oblique view of a front mount for the body of FIG. 2.

FIG. 8 is an oblique view of the assembled front mount of FIG. 8.

DETAILED DESCRIPTION OF THE PREFERRED EMBODIMENT

Referring to FIGS. 2 through 9, a detachable body and mounting system for a motorcycle trike is shown.

Figure 1:
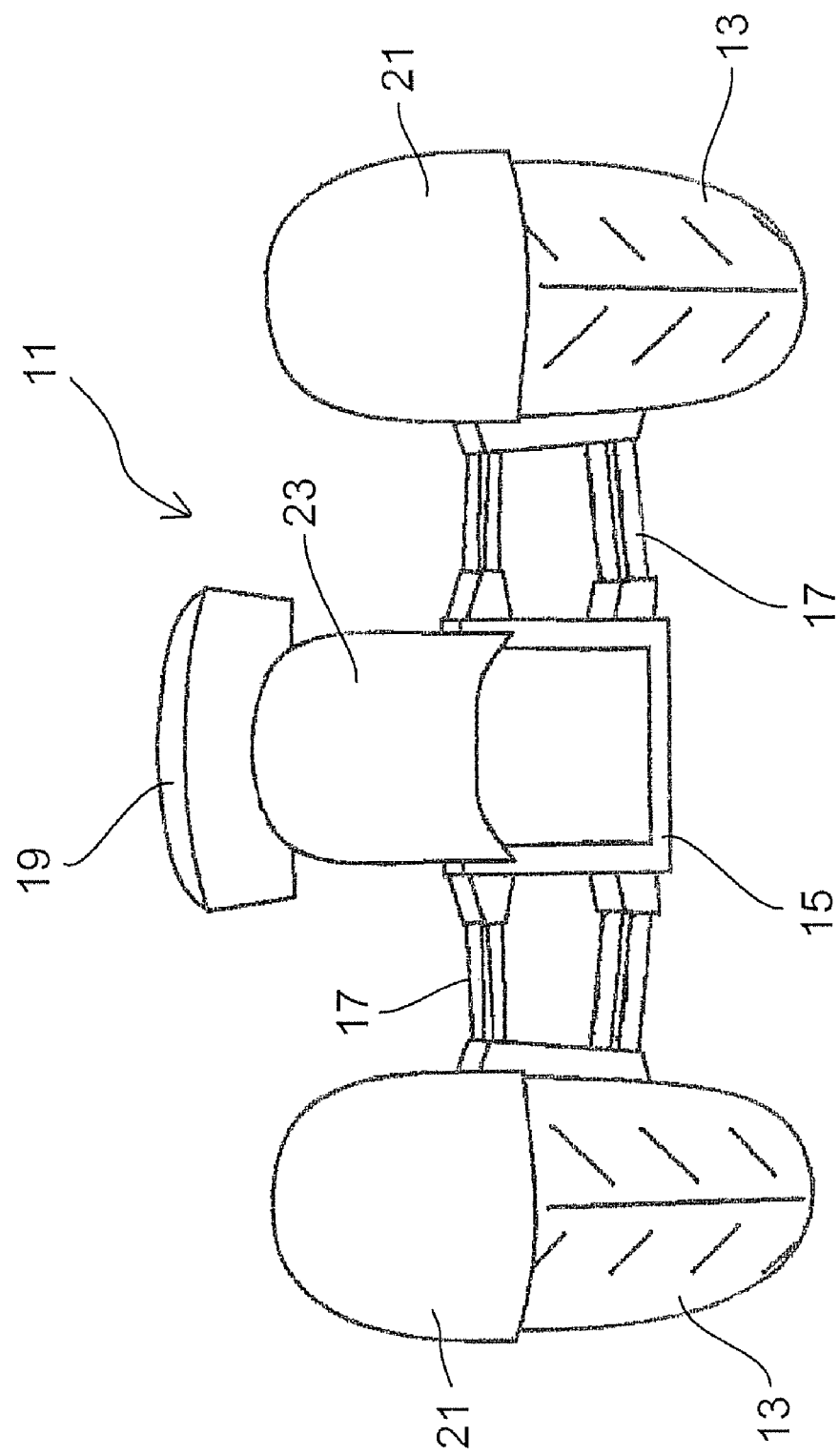
FIG. 1 is a rear view of a prior-art motorcycle trike.
Figure 2:
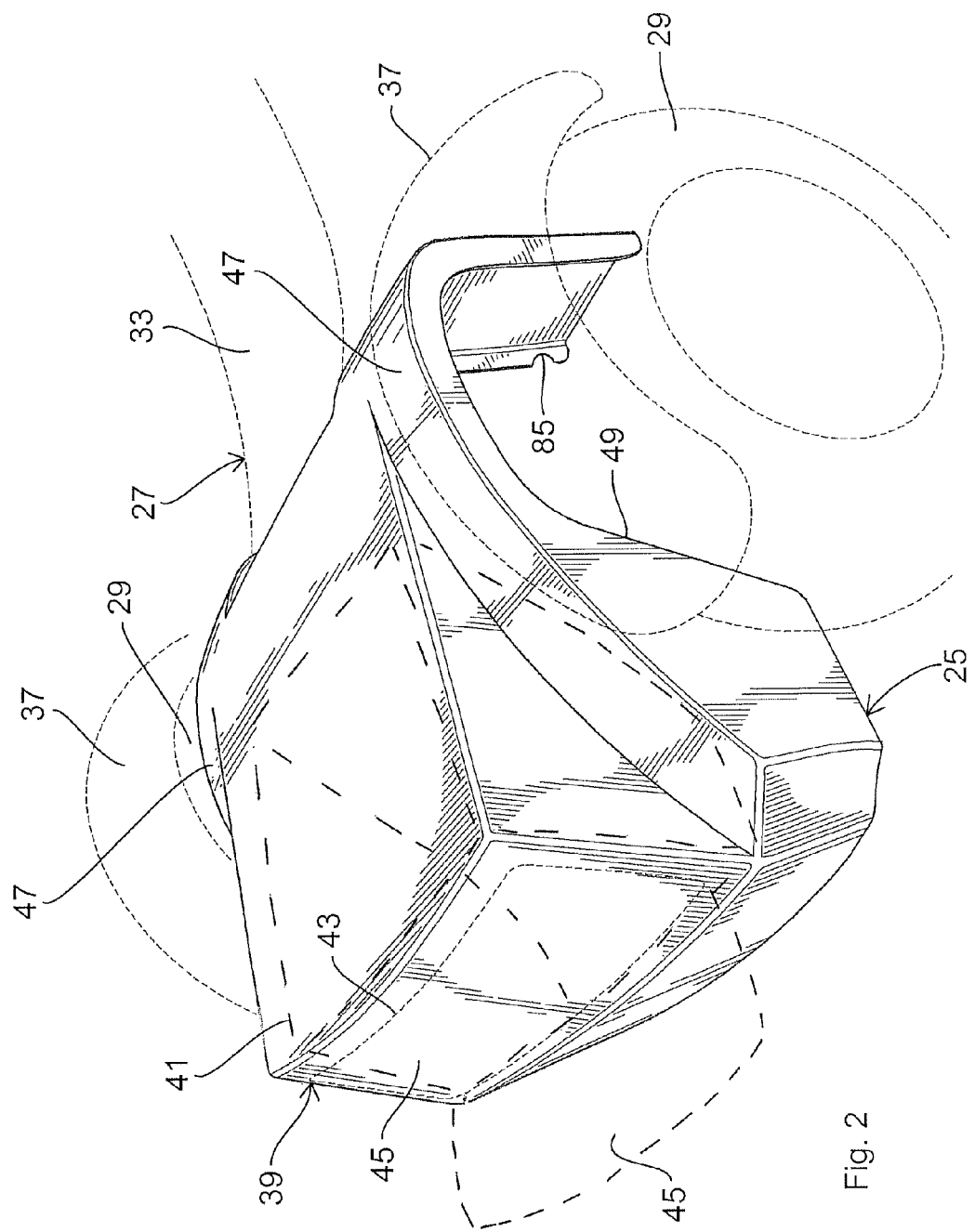
FIG. 2 is an oblique view of a detachable body, the body being installed on a trike.
Figure 3:
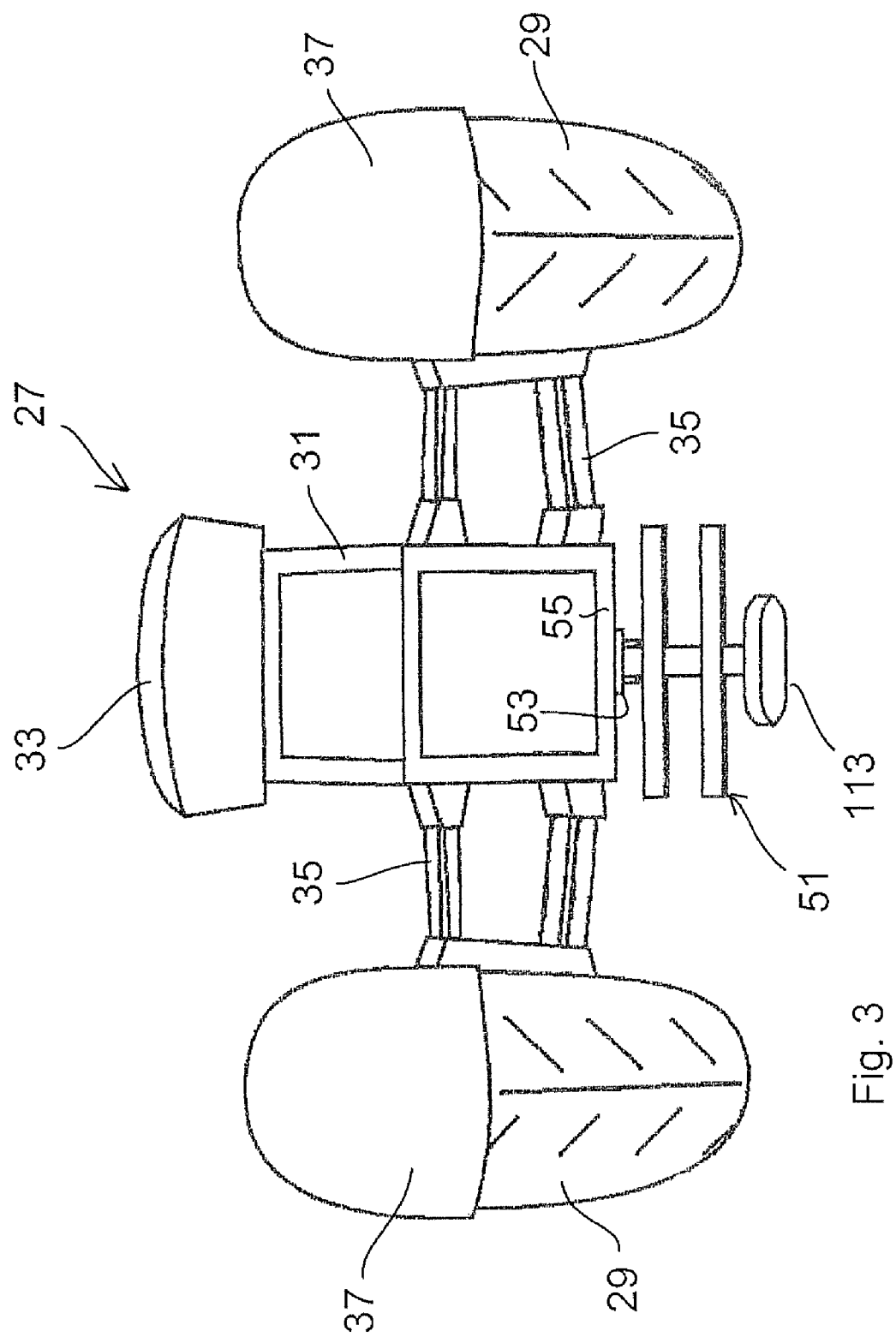
FIG. 3 is a rear view of a trike having a mounting system installed for the detachable body of FIG. 2.

FIG. 2 is an oblique view of a detachable body 25 for a motorcycle trike 27, which is shown in FIG. 3 from the rear and with body 25 removed. Trike 27 is constructed similarly to trike 11, described above, and has one front wheel assembly (not shown) and left and right rear wheel assemblies 29 (both shown in phantom in FIG. 2). A frame 31 provides for mounting of an engine and drivetrain (neither are shown), seat 33, and suspension components 35. Trike 27 has fenders 37 for covering rear wheel assemblies 29. Fenders 37 are carried by an outboard portion of suspension components 35 and are not directly connected to body 25, allowing fenders 37 to move vertically with wheel assemblies 29 and relative to body 25.

Body 25 is formed from a rigid material and is preferably formed from a fiber-reinforced plastic, such as a fiberglass or carbon-fiber composite. Body 25 comprises a trunk section 39, which encloses a trunk volume 41 within a rear portion of trunk section 39. An aperture 43 is formed in trunk section 39 and communicates volume 41 with the exterior of body 25. Aperture 43 may be formed in an upright, rearward-facing portion of trunk section 39, as shown, or aperture 43 may be formed in an alternative location, such as a top portion of trunk section 39. A door 45 is installed adjacent volume 41 so as to cover aperture 43 and provide for selective access to volume 41. Door 45 may be hinged or otherwise connected to trunk section 39 to provide for movement relative to body 25 to allow access to volume 41, or door 45 may alternatively be configured to allow for removal from body 25. In FIG. 2, door 45 is shown in phantom in one of the possible open positions, the position shown being the open position when door 45 is hinged near a lower edge portion of door 45.

In addition to trunk section 39, the embodiment of body 25 shown in FIG. 2 has a pair of optional suspension covers 47. Covers 47 may be formed as integral features of body 25 or may be formed as separate components that are attached to trunk section 39. Covers 47 extend laterally outward from opposing lateral sides of trunk section 39 for covering suspension components 35. Covers 47 also extend longitudinally for a selected distance and may extend forward of trunk section 39, as shown in the present embodiment and visible in the top view of FIG. 6. As shown, covers 47 are preferably formed to extend over and then in front of and behind suspension components 35, so that components 35 are hidden from view. Each cover 47 is formed to have an inner periphery 49 that is shaped to prevent interference with the operation of the drivetrain of trike 27 and allow for movement of suspension components 35 relative to covers 47. In an alternative embodiment, suspension covers 47 may be formed to have a greater lateral width to extend over wheel assemblies 29, eliminating the need for separate fenders 37.

Figure 4:
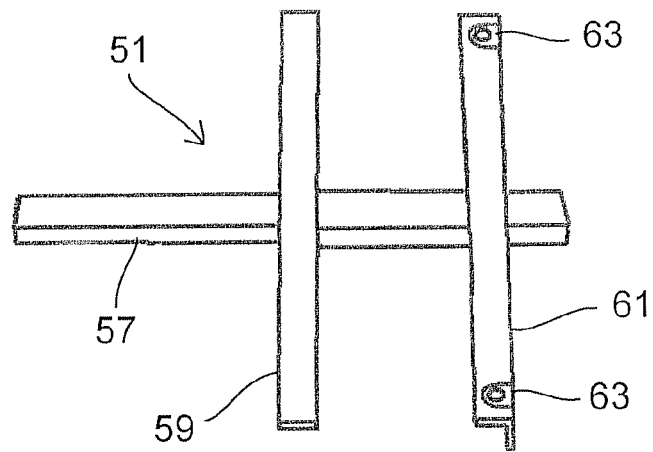
FIG. 4 is an oblique view of a detachable mounting rack of the mounting system of FIG. 3.
Figure 5:
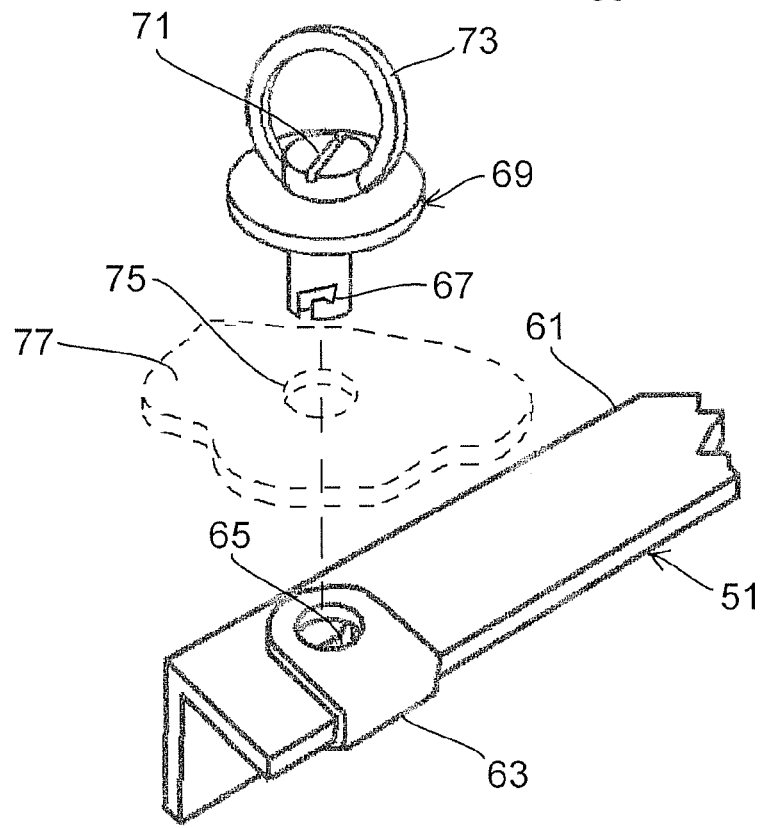
FIG. 5 is an exploded oblique view of the mounting rack of FIG. 4 and a fastener.

Referring now specifically to FIGS. 3 through 6, a rear mounting system is provided for allowing body 25 to be easily installed and removed from trike 27. A mounting rack 51 is detachably connected to frame 31 by insertion into a receiver 53, which is attached to a lower frame rail 55 of frame 31. Optionally, rack 51 may be releasably retained within receiver 53 using friction or fasteners. FIG. 4 is an oblique view of rack 51, which comprises a longitudinal central bar 57 and two cross bars 59, 61. Cross bars 59, 61 are mounted to central bar 57 so as to be generally perpendicular to central bar 57, cross bars 59, 61 being located toward a rear end portion of central bar 57 and spaced along central bar 57 from each other. In the embodiment shown, two fastener components 63 are mounted at opposing outer end portions of cross bar 61. It is preferred that fastener components 63 are of a twist-lock type or a similar type of fastener that provides for ease of installation and removal without the use of tools. In the embodiment shown in FIG. 5, fastener components 63 each have a lock feature 65 that is configured to engage a corresponding lock feature 67 on a twist-lock pin 69. Pin 69 has a slotted head 71 and a ring 73 pivotally attached to head 71, ring 73 providing for the ability of a user to rotate pin 69 without the use of tools. With the end of pin 69 inserted into component 63, rotation of pin 69 in one direction causes feature 67 to engage feature 65, whereas rotation in the opposite direction releases pin 69 from component 63.

Figure 6:
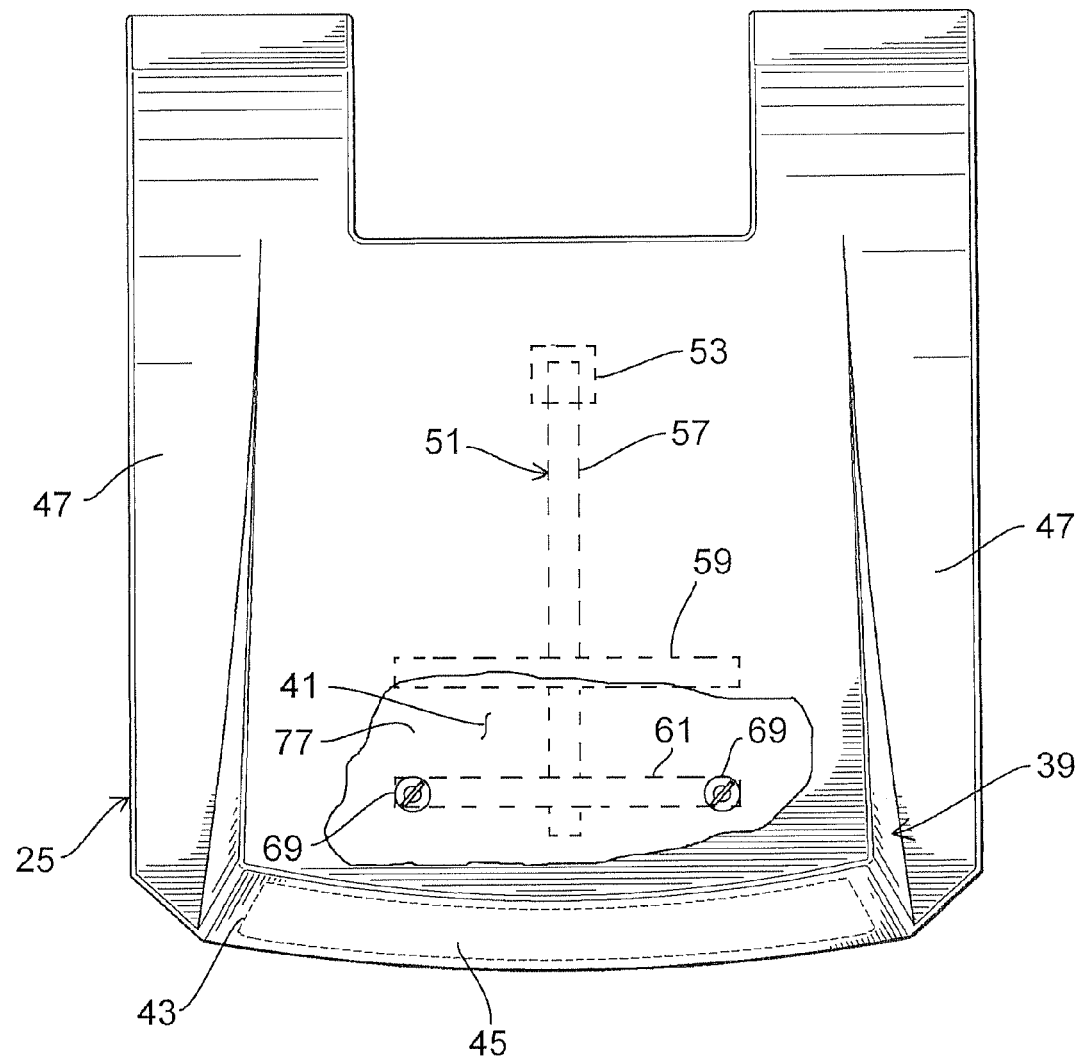
FIG. 6 is a top, partial cutaway view of the body of FIG. 2.

FIG. 6 is a top, partial cutaway view of body 25 installed on rack 51. As mentioned above, rack 51 is releasably inserted into receiver 53, which is mounted to frame 31. To mount body to rack 51, body is then placed on top of rack 51, with body centered laterally over central bar 57. In the embodiment shown, two holes 75 (shown in phantom in FIG. 5) are formed in a lower surface 77 of trunk volume 41 so that each hole 75 is generally coaxial with one of locking features 67 when body 25 is moved into the desired position. One of pins 69 is then installed through each of holes 75 from within trunk volume 41 and inserted into a fastener component 63. Pins 69 may then be rotated without tools to engage lock features 65, 67 with each other, thereby securing body 25 to rack 51 and to trike 27. Body 25 may be easily removed from trike 27 by rotating pins 69 to disengage lock features 65, 67 and removing pins from components 63 and from holes 75, allowing body to be removed from rack 51.

FIGS. 7 and 8 illustrate the preferred method for mounting the front of body 25. A pin 79, such as a bolt or screw, is used to secure a grommet 81 to a lower portion of frame 31 forward of suspension components 35 on each lateral side of frame 31. Grommet 81 is preferably formed from rubber or a similar elastomeric material to prevent damage or excessive wear to body 25. As shown, grommet 81 comprises a circumferential groove 83, and a similarly sized and shaped notch 85 is formed in a trailing edge of a lower portion of the front of each suspension cover 47. To mount the front portion of body 25, each notch 85 is inserted into groove 83 of the corresponding grommet 81, no tools being required for the installation. In the embodiment shown, the order of operations during installation is to mount the forward portion of body 25 on grommets 81 and then to mount the rear portion of body 25 to rack 51, as described above.

It should be noted that the above description of one embodiment of a detachable body 25 mentions specific types and numbers of fasteners or mounts. However, it should be noted that more or fewer fasteners and similar alternative means may be used to mount body 25 to trike 27. For example, one fastener may be used to attach body 25 to rack 51. Also, rather than using twist-lock type pins to attach body 25 to rack 51, other types of fasteners not requiring tools to be operated may be used, e.g., pins having spring-biased detents, friction-type fasteners, etc.

Figure 9:
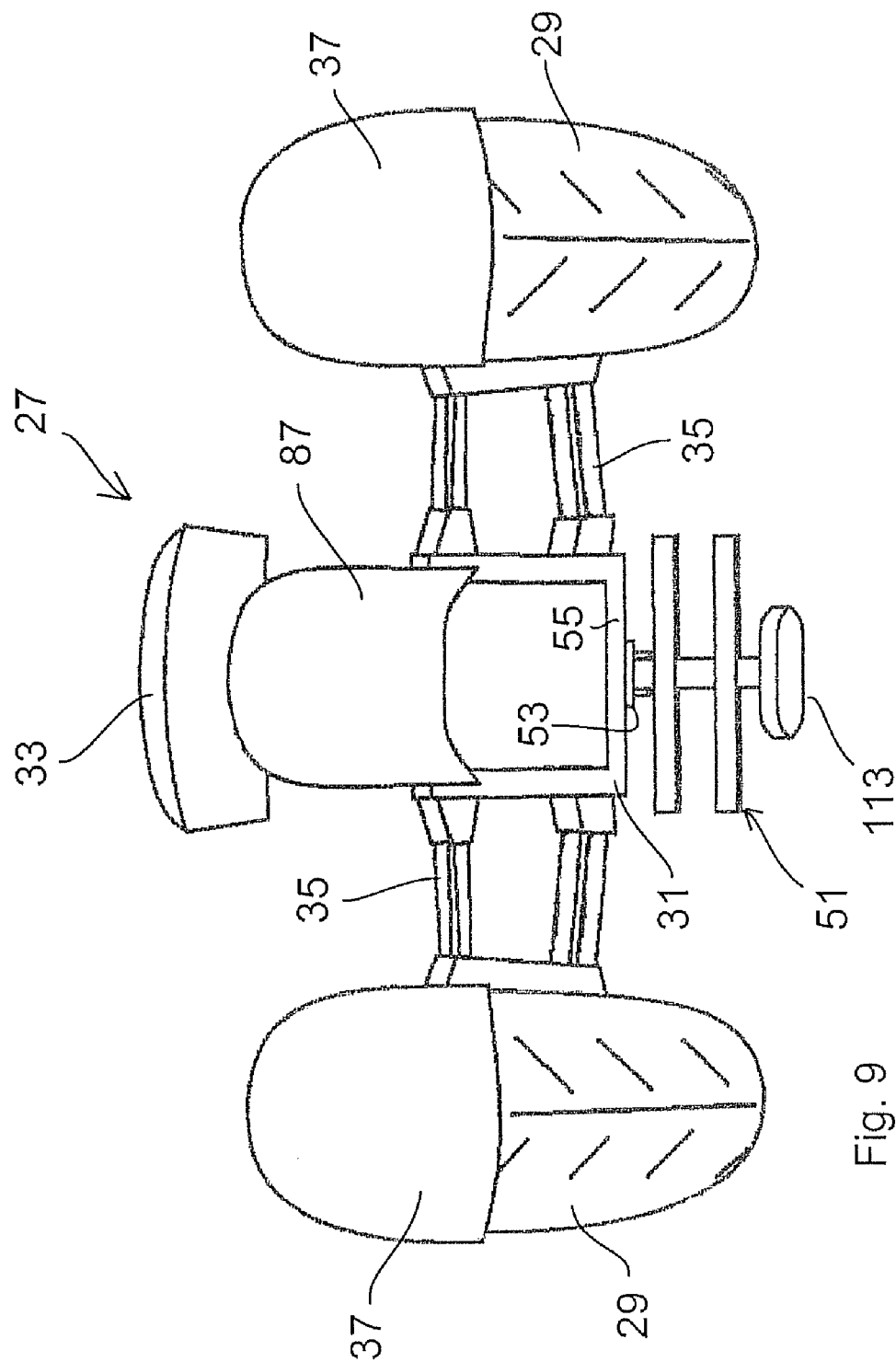
FIG. 9 is a rear view of the trike of FIG. 2 having a central drivetrain cover and a body mounting system installed thereon.
Figure 10:
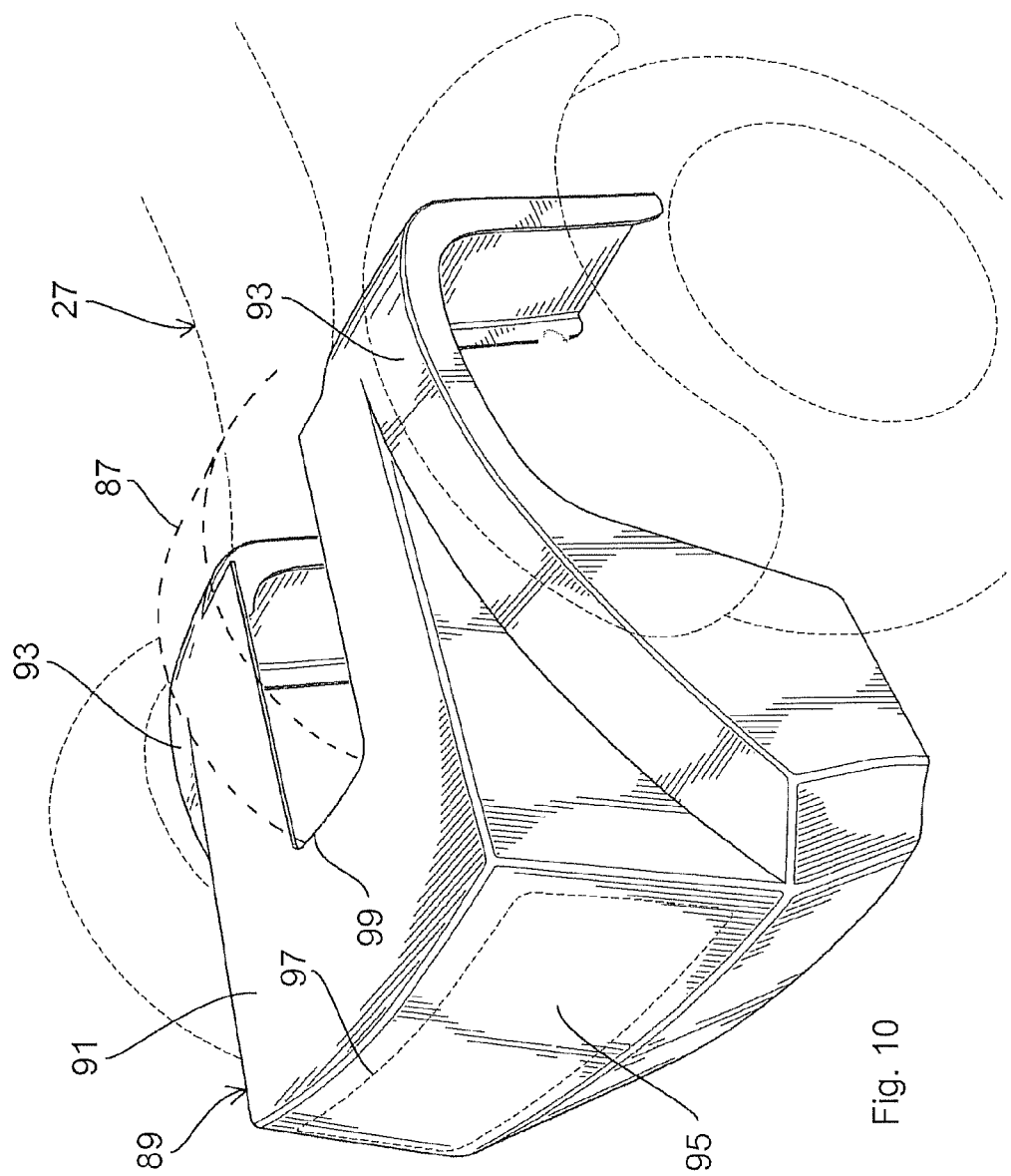
FIG. 10 is an oblique view of an alternative embodiment of a detachable body, the body being installed on the trike of FIG. 2.

FIG. 9 shows trike 27 with mounting rack 51 installed in receiver 53 and a drivetrain cover 87 installed on frame 31 rearward of seat 33. Use of drivetrain cover 87 precludes use of body 25, as described above, as body 25 cannot be mounted to trike 27 due to interference with cover 87. However, FIG. 10 illustrates an alternative embodiment of a detachable body 89 for a trike, body 89 being constructed similarly to body 25, described above. Body 89 has a trunk section 91 and suspension covers 93 on opposing sides of trunk section 91. Trunk section 91 encloses a trunk volume (not shown), which can be accessed by opening door 95 in aperture 97. Body 89 is installed on trike 27 using front and rear mounts like those described above for body 25.

To allow for use of a separate drivetrain cover 87 mounted to frame 31, a generally rectangular opening 99 is formed in the front central portion of trunk section 91. Opening 99 is sized to allow opening 99 to receive cover 87 when body 89 is installed on trike 27. Opening 99 is preferably oversized, so that there is minimal or no contact between body 89 and cover 87.

Figure 11:
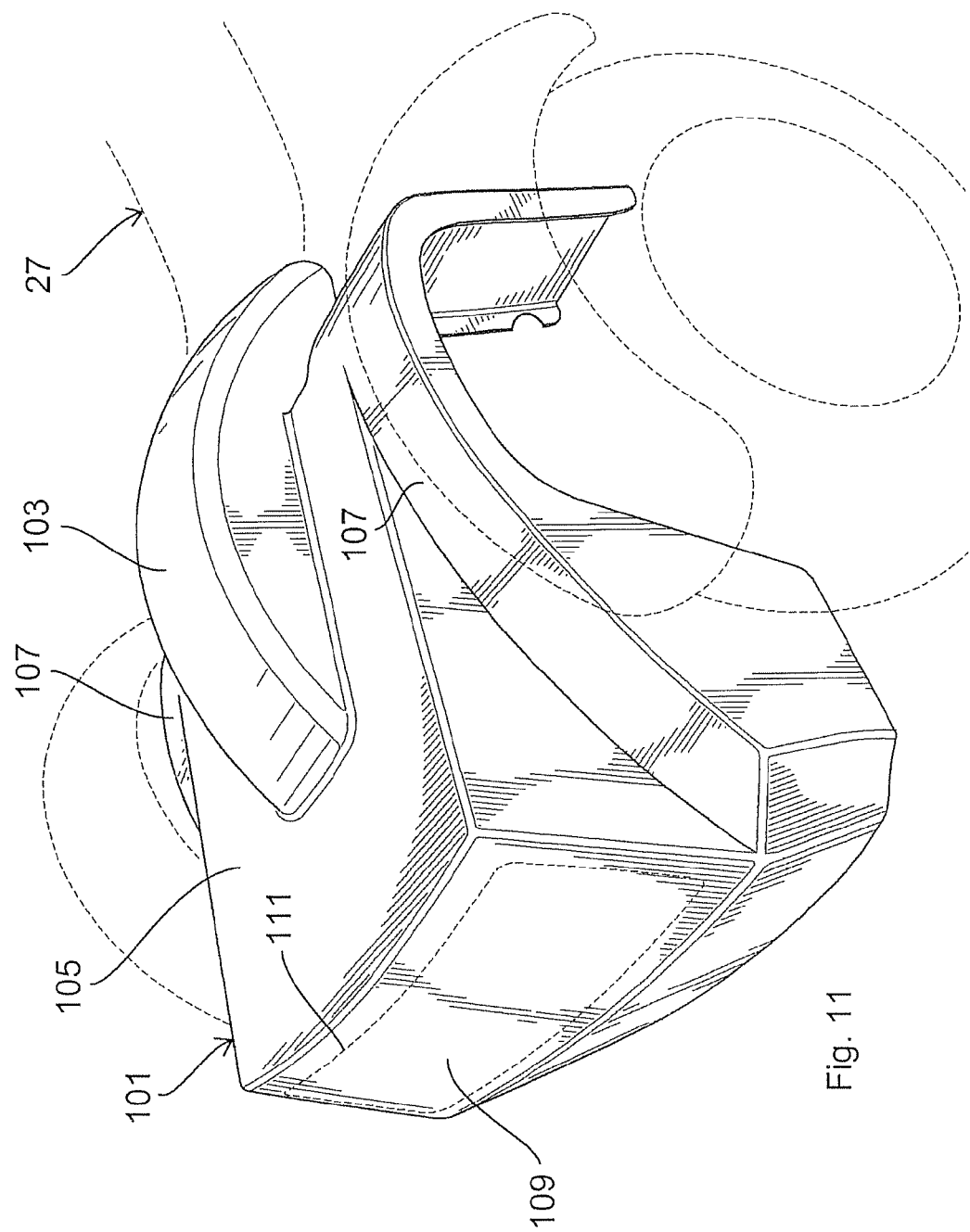
FIG. 11 is an oblique view of another alternative embodiment of a detachable body, the body being installed on the trike of FIG. 2.

Another alternative embodiment of a detachable body 101 for a trike is shown in FIG. 11. Body 101 is constructed similarly to body 25, described above, and installed on trike 27. Body 101 has an integral drivetrain cover 103 formed on a central forward portion of a trunk section 105, and suspension covers 107 extend from opposing sides of trunk section 105. Trunk section 105 encloses a trunk volume (not shown), which can be accessed by opening door 109 in aperture 111. Body 101 is installed on trike 27 using front and rear mounts like those described above for body 25.

Referring again to FIGS. 3 and 9, an optional tail lamp component 113 is shown attached to rack 51. Component 113 may be mounted in any appropriate manner to rack 51, and electrical wires (not shown) may be run through or around the members of rack 51 to provide power for operation of component 113.

The detachable body described above provides several advantages, including: (1) providing a useful body for a trike allowing for storage of items; and (2) providing for easy attachment and detachment of the body.

Figure 12:
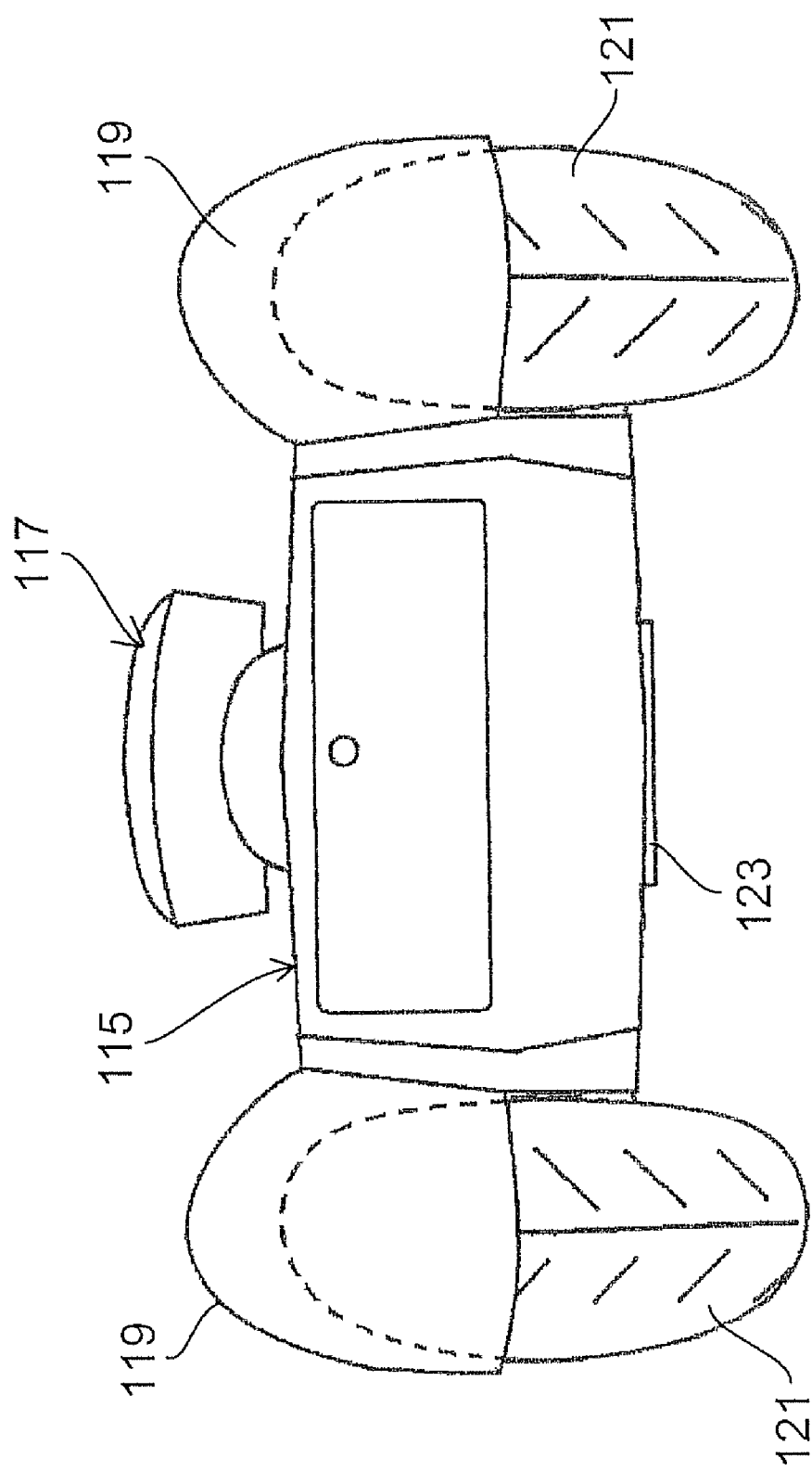
FIG. 12 is a rear view of another alternative embodiment of a detachable body and configured for use with a tilting trike.

FIG. 12 shows an additional embodiment of a detachable body 115 for a trike 117, body having integral fenders 119 that extend over rear wheel assemblies 121, eliminating the need for separate fenders that move with the wheel assemblies, such as like fenders 37 on trike 27, as described above. Trike 117 is a tilting type, wherein frame 123 is configured for tilting about a generally longitudinal roll axis during cornering. Because body 115 is attached to frame 123 and fenders 119 are integral to body 115, tilting of frame 123 also causes fenders 119 to move vertically relative to wheel assemblies 121. This motion requires that the upper surface of the inside of each fender 119 be positioned a sufficient height (as measured at zero tilt angle) above the top of the corresponding wheel assembly 121, as shown, so that the fenders 119 do not contact wheel assemblies 121 when frame 123 is tilted to the maximum angle. Additional height may be required to ensure that suspension travel caused by bumps or cornering forces while at the maximum tilt angle do not cause contact between the inside of fenders 119 and wheel assemblies 121.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

I claim:

1. A detachable body for a motorcycle trike, the body comprising:
   a rigid trunk section having an interior volume and adapted to be located between rear wheel assemblies of a motorcycle trike;

a door adjacent the volume and operable to allow access to the volume; and at least two attachment features adapted for releasably attaching the body to a frame of the trike;

wherein the attachment features are operable without the use of tools for attaching and detaching the body from the frame;

wherein one of the attachment features is a rack adapted to be removably received within a receiver attached to the frame, the rack having at least one fastener component for releasably attaching the body to the rack.

2. The body according to claim 1, wherein one of the attachment features is a grommet adapted to be affixed to the frame, a portion of the body being adapted to engage a portion of the grommet for securing that portion of the body relative to the frame.

3. The body according to claim 1, further comprising:

covers extending from lateral portions of the trunk section.

4. The body according to claim 1, further comprising:

covers extending laterally from opposing lateral portions of the trunk section;

wherein the covers are adapted to extend laterally a sufficient distance to cover adjacent rear wheel assemblies of the trike.

* * * * *